United States Patent [19]

Casasent

[11] 4,071,907
[45] Jan. 31, 1978

[54] RADAR SIGNAL PROCESSOR UTILIZING A MULTI-CHANNEL OPTICAL CORRELATOR

[75] Inventor: David Paul Casasent, Pittsburgh, Pa.

[73] Assignee: The United States of America as represented by the Secretary of the Navy, Washington, D.C.

[21] Appl. No.: 731,471

[22] Filed: Oct. 12, 1976

[51] Int. Cl.$^2$ .......................... G06G 9/00; G01S 7/16
[52] U.S. Cl. ......................................... 364/822; 343/9; 343/100 CL; 350/3.5; 350/162 SF; 364/456
[58] Field of Search ...................... 235/181; 343/11, 9, 343/8, 100 CL

[56] References Cited

U.S. PATENT DOCUMENTS

| | | | |
|---|---|---|---|
| 3,483,557 | 12/1969 | Skenderoff et al. | 235/181 |
| 3,526,895 | 9/1970 | Montlivault et al. | 343/17.5 |
| 3,594,794 | 7/1971 | Halpern | 343/11 R |
| 3,680,100 | 7/1972 | Woerrlein | 343/11 R |
| 3,732,565 | 2/1973 | Symaniec et al. | 235/181 |
| 3,809,873 | 5/1974 | Klahr | 235/181 |
| 3,887,923 | 6/1975 | Hendrix | 343/17 |
| 3,895,341 | 7/1975 | Pekau | 343/17 |
| 3,895,381 | 7/1975 | Kock | 343/17 |

*Primary Examiner*—Felix D. Gruber
*Attorney, Agent, or Firm*—R. S. Sciascia; L. I. Shrago

[57] ABSTRACT

A real-time radar processor utilizing a coherent optical system for providing target fine range and Doppler-/azimuth angle data with increased signal-to-noise and signal-to-clutter ratios. Radar signals detected by a linear phased array or successive echo signals detected by the receiver are arranged in a 2-D input format for parallel processing in a multi-channel 1-D optical correlator. Target range and azimuth angle reference data may be stored in a matched spatial filter hologram or recorded in a 2-D format similar to that of the detected radar signals according to which of three different correlation configurations are employed in the optical system. The coordinates of the correlation peak in the output plane of the correlator are proportional to the target's fine range and Doppler/azimuth angle, depending upon the type of radar signals being processed.

16 Claims, 7 Drawing Figures

RADAR SIGNAL PROCESSOR UTILIZING A MULTI-CHANNEL OPTICAL CORRELATOR

The present invention relates generally to optical apparatus and methods for processing radar signals and, more particularly, to a coherent optical processor employing multi-channel correlator configurations which yield target range and Doppler/angle data while achieving pulse compression and increased signal-to-noise and signal-to-clutter ratios.

The basic optical processor utilizer to process radar signals usually consists of a simple two-dimentional optical Fourier transform system. In the case where, for example, a phased array is being employed to obtain target direction, the heterodyned received signals from the individual detecting elements of the array are recorded by Z-axis modulation on a comparable number of lines of a transparency which is in the input plane of the optical system. When illuminated with coherent light, the 2-D Fourier transform of the input data pattern is formed in the back focal plane of a spherical lens. The position of the first-order diffracted light is proportional to the phase slope across the input signals and, hence, to the target's azimuth angle. The advantages of such a processor are that it can readily accommodate multiple targets, and it can provide data on targets in the entire search space of the radar as a continuum.

Most of the prior art optical correlators employ image plane correlation which requires mechanical movement of one or more planes or moving window transducers. Additionally, they perform correlation on the signals one line at a time, that is, in a 1-D manner. Also, the input data usually is in the form of a hologram, and the output is an image from which only a limited amount of target information can be deduced. Many also do not use coherent light.

It is, accordingly, an object of the present invention to provide a radar signal processor having an optical correlator wherein multi-channel 1-D coded radar signals may be correlated for pulse compression and with increased signal-to-noise and signal-to-clutter ratios.

Another object of the present invention is to provide an optical processor for use with a linear phased radar array which employs a multi-channel correlator wherein the correlation peak provides target fine range and Doppler, azimuth or elevation angle.

Another object of the present invention is to provide a radar multi-channel correlator wherein the location of the correlation peak contains range and doppler or angle and Doppler or angle and range target data depending on the type of radar and radar signals used.

Another object of the present invention is to provide a radar processor employing optical correlation wherein the correlation is performed in real-time simultaneously on a multiplicity of 1-D signals representing either successive radar returns or a single radar return detected on a linear phased array.

Other objects, advantages and novel features of the invention will become apparent from the following detailed description of the invention when considered in conjunction with the accompanying drawings wherein.

Briefly, and in somewhat general terms, the above objects of invention are accomplished by recording received radar data from successiive elements of a phased array or from successive pulses from a receiver in a 2-D format in the input plane of a multi-channel optical correlator. This is accomplished in one case with a real-time input device wherein radar echoes detected by a linear array, for example, are recorded on separate lines of a raster formed on the target of an electronically-addressed light modulator tube. The radar signals are present on the target as variations in its transmittance. With a correct timing relationship between the scanning of the electron beam of the EALM and the coupling of the radar signals to the tube, the horizontal offset between adjacent pulses in the input format corresponds to an incremental phase shift proportional to the target's azimuth or elevation angle for a phased array and its velocity for a pulsed radar. The common horizontal offset or starting location of all pulses corresponds to another phase shift proportional to the target's fine range. As a result of this, the location of the correlation peak in the output plane of an optical correlator, wherein a 1-D horizontal Fourier transform is followed by a 2-D transform, moves horizontally proportional to target range changes and vertically proportional to Doppler or angle changes.

Figure 1:
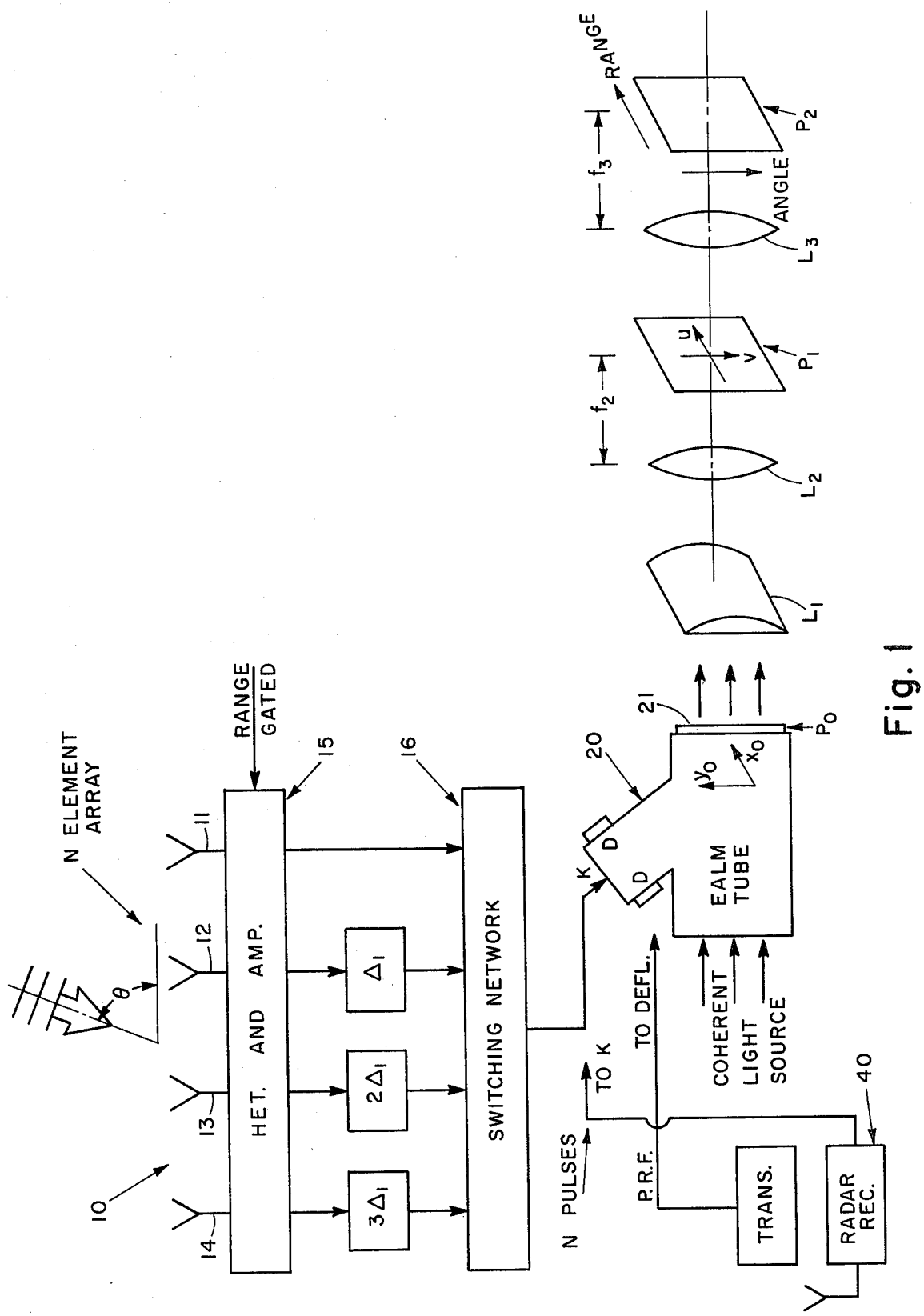
FIG. 1 is a schematic diagram of a radar signal processor utilizing a multi-channel optical correlator embodying one form of the invention.

FIG. 1 of the drawings illustrates one general arrangement for processing radar returns so as to obtain target fine range, $R_F$, and azimuth data, $\theta$. Here, these returns are detected by an N element linear array 10 whose individual elements such as 11, 12, 13 and 14 are equally spaced by a distance "$d$". This array is associated with a range gated receiver in this embodiment wherein each detected signal is subject to separate heterodyning and amplification in appropriate circuits 15. Thereafter, the resultant IF signals are fed to a switching network 16 after predetermined delays in circuits 17, 18 and 19. The need for these delays, as will be seen, is due to the real-time operation of the input device of the optical processor. More specifically, the input format is such that each signal is presented on a separate line of an electronically-addressed light modulator, EALM 20, as approprite variations in the transmittance of the tube's target. In the case selected for illustration, the signal detected by the end element 11 of the array, which is not delayed, appears on the top line of this target whereas the signal detected by the adjacent element 12 appears on the next line down. Delay 14, therefore, corresponds to $\Delta_1$, the time necessary for the electron beam of the EALM tube to sweep a single horizontal line. Delay 15, accordingly, amounts to $2\Delta_1$, delay 16, $3\Delta_1$ and so forth. The delay feature, consequently, permits the signals received on all of the array elements during the same $\Delta_1$ time interval to be recorded in one frame at the input plane $P_0$ of the optical correlator used in the processor. It will be recognized that $\Delta_1$ and the horizontal scan time $T_H$ of the EALM determine the allowable range bin size $R_B$.

Switching network 16 operates to connect the individual IF radar signals sequentially to the control electrode of the EALM tube. The general construction and operation of this light valve is described in the article, "Dielectric and Optical Properties of Electron-Beam Addressed $KD_2PO_4$" by David Cassent and William Keicher which appeared in the December 1974 issue of the Journal of the Optical Society of America, Volume 64, Number 12. However, in order to perhaps obtain a better understanding of the performance of this part of the overall system, it would be mentioned that the light valve has two off-axis electron guns, that is a high-resolution write gun and a flood or erase gun. These guns and a transparent $KD_2PO_4$ target assembly are enclosed in a vacuum chamber. Front and rear optical windows allow a collimated laser beam to pass through the target crystal which has a thin transparent conducting layer of CdO deposited on its inner surface. The beam current of the write gun is modulated by the input signal, here, the IF radar signals. As the beam is deflected in a raster scan over the target crystal, the charge patter present on the crystal spatially modulates the collimated laser input beam point-by-point.

Figure 2:
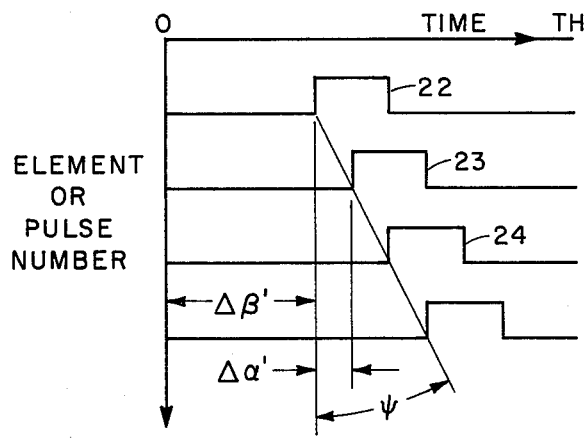
FIG. 2 is a schematic representation of the content of the input plane $P_0$ of the correlator.

In the present case, the range gated radar returns modulate the tube's beam current, and the resultant charge pattern on target 21 is illuminated by a coherent light beam from a suitable laser not shown. It would be mentioned that target 21 constitutes the input plane $P_0$ of a frequency plane optical correlator which performs simultaneous correlation of N 1-D signals, here, the signal sequence produced by the linear array, with a transmitted reference signal, the search pulse radiated by the radar. A schematic representation of a typical input frame at $P_0$ is shown in FIG. 2. For ease of presentation, this showing does not depict the transmittance of target 21 as established by the Z-axis modulation of the beam current by the IF signals. Rather, it illustrates the time relationship between the signals which modulate this current and, thus, determine this transmittance from point-to-point on the target.

Pulse 22 corresponds to the first signal detected by the array, here element 11, which is directly recorded without delay on the top line of the EALM target. Pulse 23 represents the same signal subsequently detected at the adjacent element 12 of the array. The direction of the target, in this example, is such that pulse 23 appears on the second line of the EALM later in time by an amount $\Delta\alpha$. Because of the equal spacing of the individual elements of array 10, the next pulse 24 appears delayed in time from pulse 23 by the same $\Delta\alpha$ amount. As is well known, the phase slope across these signals, angle $x$, is indicative of the target's azimuth angle.

The frequency plane optical correlator utilized in the radar processor for performing the simultaneous correlation of the N IF pulses has as its optical elements cylindrical lens $L_1$ and sphherical lens $L_2$ which image the N input lines of $P_0$ vertically and Fourier transform them horizontally at plane $P_1$, thus, effecting a 1-D multi-channel Fourier transform.

The correlator utilizes a 1-D matched spatial filter, MSF, to perform pulse compression and to produce multi-channel data with phase terms relative to those of the reference signal, here, the coded transmitted radar signal.

Figure 3:
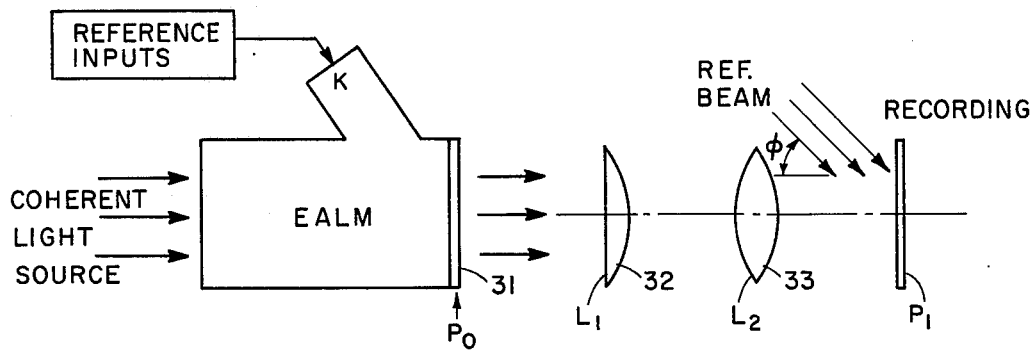
FIG. 3 illustrates one arrangement for producing the reference signal mask needed in the system of FIG. 1.
Figure 4:
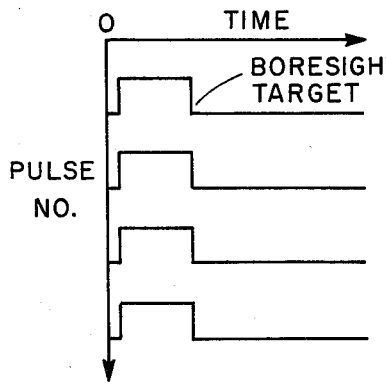
FIG. 4 is a schematic representation of the content of the input plane $P_0$ of the system of FIG. 3.

FIG. 3 illustrates an arrangement for producing a 1-D matched spatial filter for use in the system of FIG. 1 at plane $P_1$. Here again, an EALM device 30, similar to apparatus 20 in FIG. 1, has its beam current controlled in accordance with a reference signal format. This format is made up of N pulses as shown in FIG. 4. However, in this example, the pulses are arranged so that they are in vertical alignment with zero phase slope $\alpha_0 = 0$, that is, they appear at the same horizontal location on each line, thus, representing a boresite target where the radar return therefrom arrives simultaneously at all of the individual detecting elements of linear array 10. It should be recognized, of course, that the actual waveform of each reference pulse and its related spatial transmittance on the EALM target correspond to that of the transmitted radar pulse, which is known. This search pulse may be, of course, a relatively long coded signal, a chirp signal or any other suitable signal. For convenience, therefore, the azimuth reference is shown with $\Delta\alpha_0 = 0$ at $\theta = 0°$. Likewise, the range reference is selected so than $\Delta\beta_0 = 0$ with the reference pulses, consequently, recorded at the far left of $P_0$.

The signal format on target 31 constitutes the reference input at plane $P_0$ of a 1-D correlator having cylindrical and spherical lenses 32 and 33 as its optical elements. The Fourier transform of this input, as it appears in the back focal plane of lens 33, is interfered with by a plane wave arriving at $P_1$ at an angle $\phi$. The interference pattern resulting from this interaction is recorded on a suitable film which may be subsequently developed. The transparency formed in this manner serves as the reference signal mask at $P_1$ in the correlator portion of the system of FIG. 1.

It would be mentioned that if a light modulator which is capable of being optically addressed in real-time is used at plane $P_1$ of the 1-D correlator of FIG. 1, the reference function may be generated in real-time. This would provide a more versatile system. Likewise, multiple masks coded by different angle $\phi$ and with different ranges $R_F$ may be prepared and stored at $P_1$ allowing the input signal to be correlated with multiple codes in parallel.

With the matched filter having the 1-D Fourier transformed reference signals recorded therein, as obtained from FIG. 3, positioned now in $P_1$ of FIG. 1, and the new set of N returned signals recorded at $P_0$, the light distribution emerging from each of the N channels of $P_1$ will be proportional to the product of the Fourier transforms of the input signal and the reference signal on each line. A final lens in the optical train, $L_3$, performs a 2-D Fourier transform on the light distribution product emerging from $P_1$. The horizontal coordinate of the correlation peak in the output plane $P_2$ is proportional to the relative phase of the signal on each line, that is, the starting location of the signal in the input aperture. The vertical coordinate of this peak is proportional to the relative phase shift from line-to-line. Thus, in the arrangement of FIG. 1 where the signals being processed are derived from a linear phased array, the horizontal coordinate of the peak is proportional to the target's fine range $R_F$, and the vertical coordinate is proportional to the azimuth angle, $\theta$.

In the above description, the processing involved radar signals detected by a linear array for providing target angle and range data. However, the multi-channel correlating technique can be used with a pulsed radar receiver of the range gated type 40 to provide target fine range and Doppler. When associated with such a receiver, no delays, such as those introduced by circuits 17, 18 and 19 are needed. Successive radar echoes after suitable heterodyning and amplification can be directly coupled to the control electrode of the EALM device 20. The only requirement in this mode of operation is that the line scan rate of the tube must correspond to the pulse repetition frequency of the radar. The input format thus corresponds to the time history of N successive echo pulses recorded on a corresponding number of lines. The output pattern appearing at plane $P_2$ will have coordinates of range and Doppler with the horizontal dimension again being proportional to $R_F$ and the vertical to Doppler. Because of the linearity of the Fourier transform and the optical system, multiple targets present with either of the above input formats will produce multiple coorelations at plane $P_2$.

In the following analysis of the operation of the correlator of FIG. 1, the time delay in the arrival time of the signals with respect to a zero reference point at the edge of the input plane $P_0$ due to the target's fine range $R_F$ in a range bin of width $R_B$, represented by $T_H$ in FIG. 2, is denoted by $\tau_2$. The relative phase difference of this signal from the same zero reference point is denoted by $\beta$ and the actual distance across the input aperture, D, at which the signal is recorded by $\beta'$. With these definitions established then $$R_F = R_B \tau_2 / T_H \quad (1)$$

and $$R_F = R_B \beta'/D \quad (2)$$

From equation (1), if the signal starts at the left edge of $P_0$, $\tau_2 = 0$ and $R_F = 0$. If it starts half-way across the line at $\tau_2 = 0.5\, T_H$, the $R_F = 0.5\, R_B$, and, finally if it commences at the right edge of the line or aperture, $\tau_2 = T_H$ and $R_F = R_B$. The same holds true for the actual distance $\beta'$ across the aperture D at which the signal starts. The relative shift in the starting location of the signal between successive lines is $\alpha$ in phase units, $\tau_1$ in time units and $\alpha'$ in distance units. For a phased array of the type shown in FIG. 1 composed of N elements spaced by a distance "d" with a carrier wavelength, $\lambda_c$, $\alpha = (d \sin \theta)/\lambda_c = (f_{if} + f_d)\tau_1$. Where $f_d$ is the target's Doppler and $f_{if}' = f_{if} + f_d$. From this, it can be seen that $\alpha$ contains data on the target's azimuth angle $\theta$.

The signal present on one line at $x_0$, of the horizontal dimension of plane $P_0$ for a target at azimuth $\theta$ and fine range $R_F$ can be described $$v_n(x_0') = p(x_0') \sin 2\pi[f_{if}' x_0' - n\alpha - \beta] \quad (3)$$

where p is the radar transmitted coded pulse, and distance $x_0$ is related to time by $t = x_0 T_H/D$. If $x_0 = D$, $t = T_H$. $\alpha$ is, thus, proportional to $\theta$ and $\beta$ proportional to $R_F$.

With N signals of the form determined by equation (3) on N separate lines of $P_0$ and with a spacing $l_0$ between adjacent lines, the transmittance of $P_0$ is $$t(x_0, y_0) = \sum_n \delta(y_0 - nl_0)[1 + v_n(x_0)] \quad (4)$$

At $P_1$, the 1-D horizontal Fourier transform of equation (4) is present. This may be expressed as $$T(u_1, y_1) \propto \sum_n \delta(y_1 - nl_1)\delta(u_1 \pm f_{if}'')*P(u_1)\exp[-j2\pi u_1(n\alpha' + \beta')] \quad (5)$$

where P is the Fourier transform of p, $l_1 = l_0 f_2/f_1$, $f_{if}'' =$ the spatial frequency in lines/mm corresponding to $f_{if}'$ and $u_1 = x_1/\lambda f_2$ is the spatial frequency coordinate of $P_2$. Equation (5) describes the Fourier transform of p on N lines centered at $f_{if}''$ with phase proportional to $\theta$ and $R_F$. At $P_1$, there is recorded $$U(u_1, y_1) \propto \sum_n \delta(y_1 - nl_1)\delta(u_1 \pm f_{if}'')*P^*(u_1)\exp[-j2\pi u_1(n\alpha_0' + \beta_0')] \quad (6)$$

The signal leaving $P_1$ is the product of equations (5) and (6) or $$\alpha \sum_n \delta(y_1 - nl_1)\delta(\pm f_{if}'')*P^*P\exp\{-j2\pi[x_1 + u_1(n\Delta\alpha' + \Delta\beta')]\} \quad (7)$$

where $\Delta\alpha'$ and $\Delta\beta'$ are $\alpha' - \alpha_0'$ and $\beta' - \beta_0'$. $\alpha_0$ and $\beta_0$ are chosen as discussed earlier.

Lens $L_3$ with focal length $f_3$ forms the 2-D FT of equation (7) at $P_2$ or $$\delta(y_2 - \lambda f_3\Delta\alpha/l_0 f_2)\delta[x_2 - \lambda f_3 - f_3(N\Delta\alpha' + \Delta\beta')/f_1]*[p \circledast p] \quad (8)$$

Equation (8) is the desired correlation ($p \circledast p$) of transmitted coded signal. It is centered at $$x_2 = \gamma\lambda f_3 + f_3\Delta\beta'/f_1 \quad (9a)$$

$$y_2 = \lambda f_3\Delta\alpha/l_0 f_2 \quad (9b)$$

Thus, from the location of the correlation peak, we find $\theta$ from $\Delta\alpha$ and $R_F$ from $\Delta\beta'$.

Figure 5:
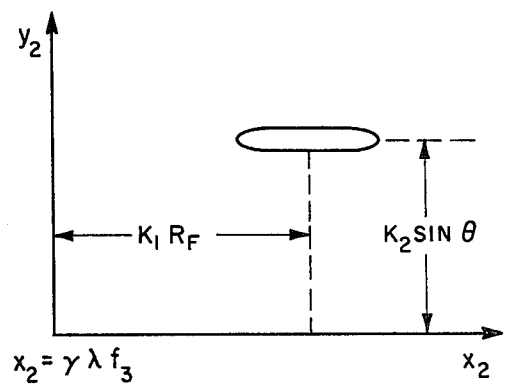
FIG. 5 depicts the appearance of the output correlation plane $P_2$ in the system of FIG. 1.

The general output format at $P_2$ is shown in FIG. 5. In this presentation, $K_1 R_F$ which equals $\Delta\beta'$ is proportional to the target's fine range and $K_2 \sin \theta$ which equals $\Delta'$ is proportional to the target's azimuth angle. The desired target data is thus available from the position of the correlation peak, while the correlator achieves pulse compression of the radar signals and increasing signal-to-noise and signal-to-clutter ratios.

Figure 6:
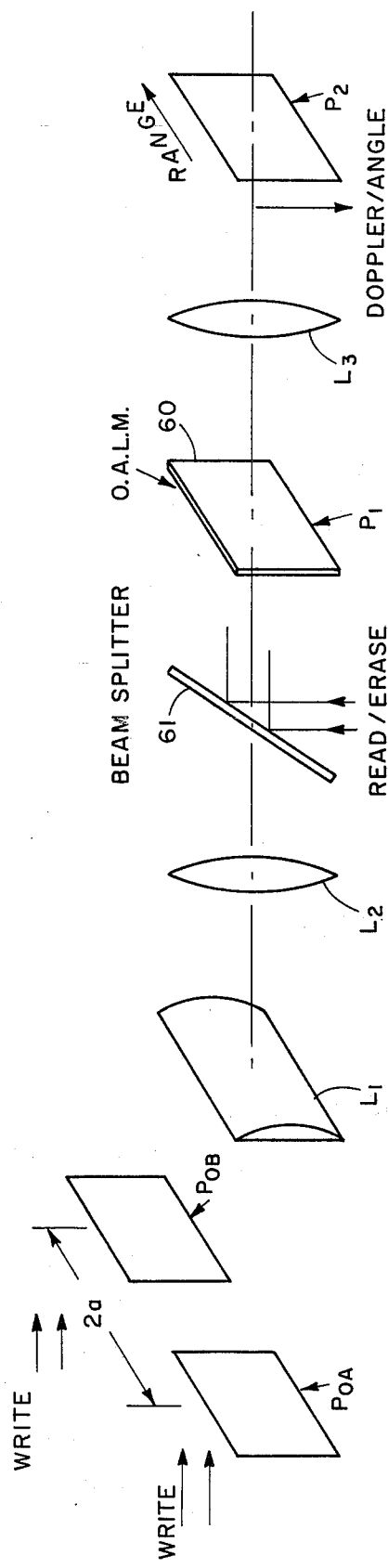
FIG. 6 is a schematic of a joint transform correlator which can be used in the radar signal processor for providing target data similar to that obtainable in FIG. 1.

FIG. 6 shows a joint transform correlator which provides target information similar to that obtainable from the system of FIG. 1. In this arrangement, the input radar signals from an array or a radar receiver are recorded at a plane $P_{0A}$ in the same manner as accomplished in FIG. 1 on, for example, the target of a first EALM device. The reference signals which were stored in a transparency in FIG. 1 and positioned at plane $P_1$ in this case are present at plane $P_{0B}$ as either a transparency or as real-time signals on the target of a second EALM device. Unlike FIG. 1 where the transforms of the reference signals are stored, here, the time versions of these signals are recorded as appropriate spatial transmittance conditions on N lines of the storage medium. Planes $P_{0A}$ and $P_{0B}$ are separated by a distance $2a$ and together these two co-planar sections form the input plane $P_0$. Both areas of this input plane are illuminated by a coherent write beam derived from a suitable laser, not shown.

The signal on line $n$ of $P_{0A}$ when simplified can be denoted by $f_1 = f(x + a) \cos 2\pi[f'_{if} + n\alpha + \beta]$ and the signal on any line of $P_{0B}$ by $f_2 = f(x-a) \cos 2\pi[f'_{if} + n\alpha_0 + \beta_0]$. Lenses $L_1$ and $L_2$ form the modulus squared of the sum of the 1-D Fourier transforms of these signals on an intensity detector at $P_1$ or $|F_1 + F_2|^2$. The term of interest at $P_1$ is $$F_1F_2^* = FF^* \exp(-2\pi j u_1 a) \exp[j2\pi(n\Delta\alpha + \Delta\beta)]f_L \quad (10)$$

where $u = x_1/\lambda f_L$, and $f_L$ is the focal length of $L_2$.

In this modification, $P_1$ comprises a real-time optically-addressed light modulator 60. This modulator is responsive to the intensity of the illuminating light energy and changes its transmittance accordingly. Consequently, the transmittance of $P_1$ corresponds to equation (10). The condition of the OALM is sensed by a real laser beam, derived from the same source that provides the write beam, which is adapted to illuminate it with a plane wave when the write beam is off. This read beam enters the optical system through a beam splitter 61, through which the write beam passes in the complementary portion of the cycle of operation of the correlator.

Lens $L_3$ forms the 2-D Fourier transform of equation (10) at output plane $P_2$. This is $$f \circledast f * \delta(x_2 - 2a - \Delta\alpha\lambda f) * \delta(y_2 - \Delta\beta\lambda f) \quad (11)$$

and here again range $\Delta\beta$ and angle or Doppler $\Delta\alpha$ of a target may be found from the location of the correlation peak $f \circledast f$.

Figure 7:
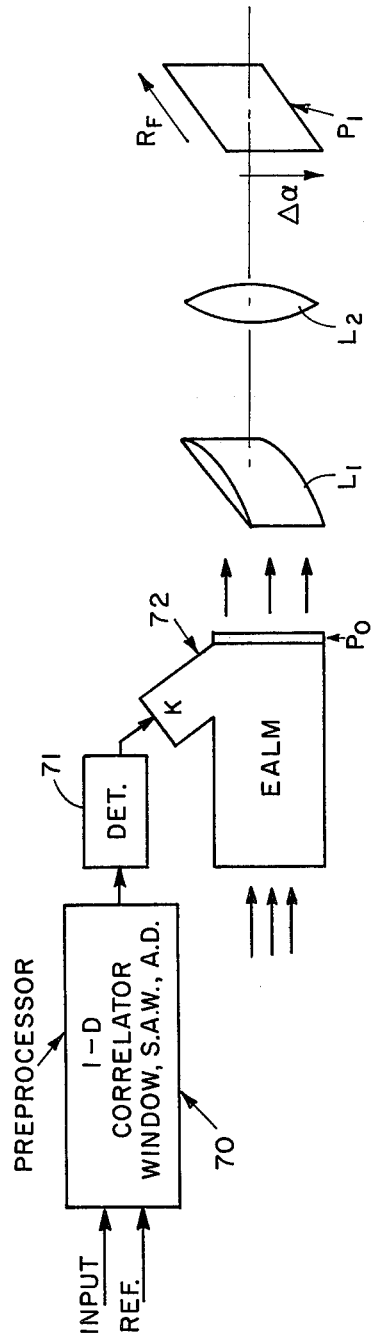
FIG. 7 illustrates a pre-processor, 1-D Fourier transform correlator also capable of providing similar target data.

FIG. 7 illustrates an alternative arrangement for providing the same target data wherein the input radar signals and the reference signals are processed in a 1-D correlator 70 which may be of the moving window, acousto-optic, or surface acoustic wave type. These signals may be represented by suitable transparencies with the one having the radar signals recorded therein positioned in the spatial domain and the other, the reference transparency, positioned in the frequency domain. Scanning is accomplished, as is well known, by a movable slit, and the correlation samples are coherently detected by a suitable photodetector, here represented by reference character 71, located in the output plane. The output of detector 71 in the present case is applied to the control electrode of the EALM device 72 to modulate the intensity of the tube's beam current. Its horizontal scan rate is equal to the pulse repetition rate of the radar.

For N radar returns or the signals from N antenna elements of an array recorded on N lines of the EALM tube, which correspond to plane $P_0$, the input is a cosine wave at $f_{if}$, whose amplitude envelope is the correlation of the transmitted signal. The location of this wave on a line is proportional to the target's fine range $R_F$. The phase from line-to-line of this signal to $n\Delta\alpha$. The input format at plane $P_0$ is subject to a 1-D Fourier transform by lenses $L_1$ and $L_2$. However, in this case, the transform is in the vertical dimension. As a result, the correlation at output plane $P_1$ is such that the horizontal location of the correlation peak is proportional to $R_F$ and its vertical location proportional to $\Delta\alpha$.

The arrangement shown in FIG. 1 has an important advantage over those shown in FIGS. 6 and 7 in that it can accommodate multiple filters, and these filters can be readily changed. The joint transform correlator of FIG. 6, however, has less stringent positioning and alignment requirements in the optical portion of the system. It does, however, require a larger input plane. The configuration shown in FIG. 7 has easier alignment requirements than the system of FIG. 1. Additionally, it need have only one real-time 2-D device at input plane $P_0$ and a 1-D correlator in the pre-processor. It does, however, require coherent detection.

It would be mentioned that the above systems can be utilized to process radar data from a wide variety of radar apparatus such as those utilizing coded transmission, fm step transmissions etc.

What is claimed is:

1. In an electro-optic signal processor for providing target range and azimuth data from radar signals detected by an N element linear phased array, the combination of
   an optically readable signal storage device;
   means for recording each radar signal so detected as a corresponding transmittance condition on N lines of said signal storage device,
      each signal recording being at a horizontal location such that the vertical phase slope across these recordings is indicative of the azimuth angle of the target from which the detected signal originated;
   a multi-channel optical correlator having an input, frequency and output plane,
      said correlator being of the type wherein the 1-D horizontal Fourier transform is performed between its input and frequency planes and a 2-D Fourier transform between its frequency and output planes;
   a multi-channel 1-D matched spatial filter having target azimuth and range reference data stored therein in the form of an interference pattern,
      said signal storage device being arranged such that the pattern of transmittance conditions representing the detected radar signal appears at the input plane of said correlator,
      said matched filter being positioned such that the interference pattern stored therein appears at the frequency plane of said correlator; and
   means for illuminating said input plane with a coherent light beam whereby the correlation peak appearing in the output plane of said correlator has coordinates that are proportional to the range and azimuth angle of said target.

2. In an arrangement as defined in claim 1 wherein each radar signal detected by said array is recorded in real-time in said optically readable signal storage device.

3. In an arrangement as defined in claim 2 wherein said optically readable signal storage device includes an electronically-addressed light modulated tube and wherein an IF signal derived from said detected signal modulates the beam current of said tube.

4. In a radar signal processor for use with an N element linear phased array for obtaining target range and angle data, the combination of
   an optically readable signal storage device;
   means for recording the N signals detected by said linear array on N horizontal lines of said signal storage device such that the vertical phase slope of the signal recordings is indicative of the angle of the target from which said signals originate, the location of each signal recording with respect to a vertical reference being related to the fine range within a range bin of said target;

a multi-channel 1-D optical correlator having an input, frequency and output plane, said signal storage device being arranged such that the signals recorded therein constitute the input image at the input plane of said correlator;

a multi-channel 1-D matched spatial filter positioned at the frequency plane of said correlator and having preselected target angle and target fine range reference data recorded therein; and means for illuminating the input plane of said correlator with a coherent light beam whereby the horizontal and vertical coordinates of the correlation peak appearing in the output plane of said correlator indicate the fine range and angle of the target, respectively.

5. In an arrangement as defined in claim 4 wherein said signal storage means includes an electronically-addressed light modulated tube whose beam current is modulated by the signals detected by said linear array.

6. In an arrangement as defined in claim 4 wherein said multi-channel optical correlator performs a 1-D Fourier transform between its input and frequency planes.

7. In an arrangement as defined in claim 6 wherein said 1-D optical correlator performs a 2-D Fourier transform between its frequency and output planes.

8. In an electro-optic signal processor for providing target range and azimuth angle data from radar signals detected by an N element linear phased array, the combination of an optically readable signal storage device;

means for recording each detected radar signal as a corresponding transmittance condition on N lines of said signal storage device, each signal recording being at a horizontal location such that the vertical phase slope across these recordings is indicative of the azimuth angle of the target from which the detected signal originated;

a multi-channel 1-D optical correlator having an input, frequency and output plane, said correlator being of the type wherein the 1-D horizontal Fourier transform is performed between its input and frequency planes and a 2-D Fourier transform between its frequency and output planes;

a recording of the interference pattern resulting from the interaction of a coherent light beam and a 1-D horizontal Fourier transform of a reference image, said reference image consisting of N representations of the transmitted radar signal arranged such that the vertical phase slope across these representations defines a particular target azimuth angle and the horizontal position of these representations with respect to a vertical reference defines a particular target range, said signal storage device being arranged such that said transmittance conditions appear at the input phase of said correlator, said recording being positioned such that said interference pattern appears at the frequency plane of said correlator; and means for illuminating said input plane with a coherent light beam whereby the correlation peak appearing in the output plane of said correlator has coordinates that are proportional to the range and azimuth angle of said target.

9. In an electro-optic signal processor for providing target range and Doppler data from detected radar signals, the combination of an optically readable signal storage device;

means for recording successive radar echo signals derived from a particular target as corresponding transmittance conditions at a like number of horizontal locations on said signal storage device, the position of each signal representation from a vertical reference being indicative of the range of said target;

a multi-channel optical correlator having an input, frequency and output plane, said correlator being of the type wherein a 1-D horizontal Fourier transform is performed between its input and frequency planes and a 2-D Fourier transform between its frequency output planes;

a multi-channel 1-D matched spatial filter having target range and Doppler reference data recorded therein as an interference pattern, said signal storage device being arranged such that the pattern of transmittance conditions recorded therein provide the input information at the input plane of said correlator, said spatial filter being positioned such that the interference pattern recorded therein appears at the frequency plane of said correlator; and means for illuminating the input plane of said correlator with a coherent light beam whereby the correlation peak appearing in the output plane of said correlator has coordinates which are proportional to the range and Doppler of said target.

10. In an arrangement as defined in claim 9 wherein said optically readable signal storage device comprises an electronically-addressed light modulated tube whose beam current is modulated by said radar echo signals.

11. In an electro-optic signal processor for providing target range and azimuth data from the radar signals detected by an N element linear phased array, the combination of an optically readable signal storage device;

means for recording each radar signal so detected as a corresponding optical transmittance condition on N lines of said signal storage device at horizontal locations such that the vertical phase slope across these recordings is indicative of the azimuth of the target from which this signal originated;

a multi-channel optical correlator having an input, frequency and output plane, said correlator being of the type wherein a 1-D horizontal Fourier transform is performed between its input and frequency planes and a 2-D Fourier transform between its frequency and output planes;

a matched spatial filter hologram having target azimuth and range reference data recorded therein as an interference pattern, said signal storage device being arranged such that the pattern formed by the recorded transmittance conditions appear at the input plane of said correlator, said matched spatial filter hologram being positioned such that the interference pattern recorded therein also appears at the input plane of said correlator;

an optically-addressable light modulator positioned at the frequency plane of said correlator and adapted to register the light distribution resulting from the 1-D horizontal Fourier transform of said patterns; and means for illuminating said input plane and said light modulator with a coherent light during mutually exclusive time intervals whereby the correlation peak appearing in the output plane of said correlator has coordinates that are proportional to the range and azimuth of said target.

12. In an arrangement as defined in claim 11 wherein the interference pattern stored in said 1-D matched spatial filter hologram is the result of the interaction of a coherent light beam and a 1-D horizontal Fourier transform of an image composed of reference signal representations on N horizontal lines of a signal storage medium, each representation being a reproduction of the pulse waveform transmitted by the radar.

13. In an arrangement as defined in claim 11 wherein the relative horizontal locations of said reference signal representations with respect to a vertical reference corresponds to a particular target azimuth angle.

14. In an arrangement as defined in claim 11 wherein the horizontal locations of said reference signal representations with respect to said vertical reference correspond to a particular target range.

15. An electro-optic signal processor for providing target range and azimuth angle data from radar signals detected by an N element linear phased array, comprising in combination a recording of the radar signals detected by said array, said recording consisting of N optical signal representations occurring at different horizontal locations such that the vertical phase slope across these representations is related to the azimuth angle of the target from which said signals originate;

a 1-D matched spatial filter hologram having preselected target range and azimuth angle reference data recorded therein as an interference pattern;

correlator means for performing a 1-D optical correlation of said recording and said matched spatial filter hologram and for producing an output signal indicative of the position of any correlation peaks present in the output plane of said correlator means;

means responsive to said output signal for forming a transmittance pattern which is similar to the image appearing in the output plane of said correlator means; and means for performing a 1-D vertical Fourier transform of said transmittance pattern whereby the correlation peak so produced has coordinates proportional to the range and azimuth angle of said target.

16. In an arrangement as defined in claim 15 wherein said means for forming said transmittance pattern comprises an electronically-addressed light modulator tube; and means for modulating the electron beam current of said tube in accordance with said output signal.

* * * * *